3,478,131
POLYOLEFIN BLEND HAVING HOT TACK STRENGTH

Willard H. Wharton and Barry A. Cooper, Lake Jackson, Tex., assignors to The Dow Chemical Company, Midland, Mich., a corporation of Delaware
No Drawing. Filed May 29, 1967, Ser. No. 642,173
Int. Cl. C08f *29/12;* C09j *3/14;* B32b *27/10*
U.S. Cl. 260—897                                                                 15 Claims

ABSTRACT OF THE DISCLOSURE

A homogeneous blend of solid olefin polymers having various densities and melt indexes useful to heat seal cellulosic containers. A ternary blend of a high density polyethylene or isotatic polypropylene with two low density polyethylenes having different melt indexes was found to give superior hot tack.

---

This invention relates to a blend of solid polyolefin resins of different densities and melt indexes possessing desirable adhesive strength when hot and therefore of utility in the packaging arts.

It is well known in the art to heat seal a bag or carton of a sheet material such as a cellulosic sheet using a blend of ethylene-vinyl acetate copolymers with petroleum wax.

Recently, it has been found that a blend of ethylene-vinyl acetate copolymer, methyl styrene-vinyl toluene copolymer, and petroleum wax has the property called "hot tack." Polymer blends having hot tack have the ability, when coated on a cellulosic substrate, of forming a seal which will not separate during the forming and filling of the bags or containers made from the cellulosic substrate. In other words, the seal formed from a polymer blend having hot tack will not separate in the temperature range normally employed for heat sealing, usually 100°–204° C.

It is known that binary blends of a high density polyethylene and a low density polyethylene can produce high moisture vapor impermeability and high stiffness. However, the present invention provides a ternary blend which has been found to possess hot tack and thus represents a useful advance in the art.

It has now been found that certain ternary blends of polyolefin polymers of various densities and melt indexes have superior adhesive properties when they are hot and even when they are in the molten state.

Broadly, the ternary blend comprises a homogeneous mixture or blend of:

(1) About 20–75% by weight of a solid, high density ethylene polymer having a density in the range 0.94 to 0.97 at 23° C. and a melt index in the range 0.01 to 7.0 or a solid, low density isotactic propylene polymer having a density in the range 0.90 to 0.91 at 23° C. and a melt flow in the range 3 to 20 with (2) About 80–25% by weight of a blend of 25–50% by weight of a solid, highly branched ethylene polymer having a low density in the range 0.915 to 0.917 at 23° C. and a melt index in the range 4 to 7 with 75–50% by weight of a similar low density ethylene polymer but having a melt index in the range of 10 to 14.

The resulting blends of (1) and (2) above have a density in the range of 0.914 to 0.955 g./cc. and a melt index in the range of 4 to 10.

It has been unexpectedly discovered that the tenacity of these blends is so great that when coatings of these blends are heat sealed between two pieces of kraft paper with a thickness of about 1 mil (0.001 inch), and an attempt is made to pull the papers apart, the fibers of the paper are torn from the paper substrate at a broad temperature range (i.e. 100° to 150° C.) In the heat sealing art, this temperature range is considered relatively broad.

It is thus apparent that the blends of this invention possesses great utility in the form and fill packaging art where cellulosic sheet material such as paper, cellophane, paper board, glassine, etc. is formed into a tube or cylinder sealed at one end, and filled with various diverse items such as milk, potato chips, peanuts, nuts and bolts. The machines in this art operate at a high rate of speed (i.e. 50–350 units per minute). By using the blends of this invention, one can achieve even higher speeds; one does not have to wait for the seal to cool, because the present blend has a higher hot tack.

The linear high density polyethylenes used in this invention can be made by methods known to the art such as the Ziegler process.

The highly branched low density (0.90–0.935) polyethylenes used in this invention can be made by known processes such as those set forth in U.S. Patents 2,188,465; 2,153,553; 2,921,059 and 2,833,755.

The low density (0.86–0.91) isotactic polypropylene likewise can be prepared by known processes such as British Patent 810,023.

In general, the high density polyethylenes used in this invention have a melting point of greater than 132° C. whereas the low density polyethylenes have a melting point of less than 109° C. and the isotactic polypropylenes have a melting point of 170° C. or higher.

The following examples will illustrate the invention. In all cases the melt index is determined by ASTM D–1238–65T (g./10 min.). The densities are reported as g./cc. at 23° C.

EXAMPLE 1

A homogeneous blend was made by extruding in a 2½″ Farrell-Birmingham induction heated extruder, (7.26 kg.) 32% by weight of .967 g./cc. density, 6.5 melt index, linear polyethylene, (7.72 kg.) 34% by weight of .916 g./cc. density, 12.0 melt index highly branched polyethylene and (7.72 kg.) 34% by weight of a 0.917 g./cc. density, 5.0 melt index highly branched polyethylene.

The density of the resulting blend was .930 g./cc. with a melt index of 8.0.

This blend was then extrusion coated onto 40-pound bleached kraft paper using a 2½″ Egan extruder. The extruder was adjusted to provide a 0.001″ thick coating on the paper at a melt temperature of 610° F.

The extruded blend was tack tested by cutting it into a two inch strip and making a "sandwich" out of the strip with the one mil coating of each strip in contact with the other. This sandwich was then placed on a long flat iron bar and the bar heated on one end and cooled at the other so that a temperature gradient was established along the length of the bar. The temperature of the sandwich was allowed to come to equilibrium with the gradient of the bar. The uppermost paper strip was then peeled back at 25 inches/minute and at an angle of 180° (pulling from the heated end) and the force required to separate the two lamina was recorded. It was found that at temperatures in the range from about 110° to 125° C. there was failure of the fibers in the paper.

When the experiment was repeated using a similar binary blend of a high density polyethylene with a low density polyethylene (i.e. one having the same density and same melt index), it was found that there was no tearing of the fibers and the hot tack strength of the binary blend was inferior to the ternary blend of this invention.

EXAMPLE 2

In the manner of Example 1, the following blend was tested:

4.54 kg. (20%) of linear polyethylene having 0.967 g./cc. density, 6.5 melt index
13.62 kg. (60%) of highly branched polyethylene having 0.916 g./cc. density, 12.0 melt index
4.54 kg. (20%) of highly branched polyethylene having 0.917 g./cc. density, 5.0 melt index The blend had a density of 0.923 g./cc. and a melt index of 8.0.

The superior hot tack properties of this blend were evidenced by fiber tearing over the temperature range of 110° to 133° C.

EXAMPLE 3

In the manner of Example 1, the following blend was tested:

4.54 kg. (20%) of isotactic polypropylene having 0.905 g./cc. density and 15 g./min. melt flow
13.62 kg. (60%) of highly branched polyethylene having 0.916 g./cc. density and 12.0 melt index
4.54 kg. (20%) of highly branched polyethylene having 0.917 g./cc. density and 5.0 melt index This blend had a density of 0.914 and a melt index of 4.0.

Fiber tear was observed within the temperature range of 108° to 145° C.

EXAMPLE 4

In the manner of Example 1, the following blend was tested:

73% by weight of linear polyethylene having 0.967 g./cc. density and 6.5 melt index
20% by weight of highly branched polyethylene having 0.916 g./cc. density and 12.0 melt index
7% by weight of highly branched polyethylene having 0.917 g./cc. density and 5.0 melt index Substantially the same result as in Example 3 was achieved.

The same results are achieved by formulating blends of 40–75% by weight of linear polyethylene with the remaining part (60–25%) being a combination of two low density highly branched polyethylenes with melt indexes ranging from 4–7 and 10–14.

Similar blends containing 20–60% by weight of low density isotactic polypropylene can be made, in which the polypropylene is substituted for the linear high density polymer above and the remainder (80–40%) being a combination of the above two low density polyethylenes.

We claim:

1. A homogeneous blend of olefin polymers having a density of from 0.914 to 0.955 at 23° C. and a melt index of from 4 to 10 and having hot tack in the temperature range of 100–204° C. comprising:
    (a) 20–75% by weight of a solid polymer selected from the group consisting of high density polyethylene having a density in the range 0.94 to 0.97 at 23° C. and isotactic polypropylene having a density in the range 0.90 to 0.91 at 23° C. and
    (b) 80–25% by weight of a blend of 25–50% by weight of a solid, highly branched ethylene polymer having a low density in the range 0.915 to 0.917 and a melt index in the range 4 to 7 with 75–50% by weight of a low density ethylene polymer having a density in the same range and having a melt index in the range 10 to 14.

2. A homogeneous blend of olefin polymers having a density of from 0.914 to 0.955 at 23° C. and a melt index of from 4 to 10 and having hot tack in the temperature range of 100–204° C. consisting of:
    (a) 40–75% by weight of a solid linear polyethylene having a density of 0.94 to 0.97 and
    (b) 60–25% by weight of a blend of 25–50% by weight of a solid, highly branched ethylene polymer having a low density in the range 0.915 to 0.917 and a melt index in the range of 4 to 7 with 75–50% by weight of a low density ethylene polymer having a density in the same range and having a melt index in the range 10 to 14.

3. A homogeneous blend of olefin polymers having a density of from 0.914 to 0.955 at 23° C. and a melt index of from 4 to 10 and having hot tack in the temperature range of 100–204° C. consisting of:
    (a) 20–60% by weight of isotactic polypropylene having a density in the range 0.90 to 0.91 and
    (b) 80–40% by weight of a blend of 25–50% by weight of a solid, highly branched ethylene polymer having a low density in the range 0.915 to 0.917 and a melt index in the range 4 to 7 with 75–50% by weight of a low density ethylene polymer having a density in the same range and having a melt index in the range 10 to 14.

4. A homogeneous blend of olefin polymers having a density of 0.914 at 23° C. and a melt index of 4.0 comprising:
    (a) 20% by weight of isotactic polyproylene having a density of 0.905 at 23° C.;
    (b) 60% by weight of a highly branched polyethylene having a density of 0.916 at 23° C. and a melt index of 12.0 and
    (c) 20% by weight of a highly branched polyethylene having a density of 0.917 at 23° C. and a melt index of 5.0.

5. A homogeneous blend of ethylene polymers having a density of .930 at 23° C. and a melt index of 8.0 and having hot tack in the temperature range of 100–204° C. comprising:
    (a) 32% by weight of a solid, substantially linear ethylene polymer having a density of .967 at 23° C.,
    (b) 34% by weight of a solid, highly branched ethylene-polymer having a density of .916 at 23° C. and having a melt index of 12.0; and
    (c) 34% by weight of a solid highly branched ethylene polymer having a density of .917 at 23° C. and having a melt index of 5.0.

6. A coating comprising the blend of claim 1 on a cellulosic substrate.

7. A coating comprising the blend of claim 1 on a paper substrate.

8. A coating comprising the blend of claim 2 on a cellulosic substrate.

9. A coating comprising the blend of claim 2 on a paper substrate.

10. A coating comprising the blend of claim 3 on a cellulosic substrate.

11. A coating comprising the blend of claim 3 on a paper substrate.

12. A coating comprising the blend of claim 4 on a cellulosic substrate.

13. A coating comprising the blend of claim 4 on a paper substrate.

14. A coating comprising the blend of claim 5 on a cellulosic substrate.

15. A coating comprising the blend of claim 5 on a paper substrate.

References Cited

UNITED STATES PATENTS 3,125,548   3/1964   Anderson _____ 260—45.5

MURRAY TILLMAN, Primary Examiner

C. J. SECCURO, Assistant Examiner

U.S. Cl. X.R.

117—145, 155; 161—250